(12) United States Patent
Henrich et al.

(10) Patent No.: US 7,322,618 B2
(45) Date of Patent: Jan. 29, 2008

(54) HOSE COUPLING

(75) Inventors: Detlef Henrich, Limeshain (DE); Mathias Krauss, Maintal (DE); Goran Lebo, Offenbach/Main (DE); Stephan Mann, Bieber (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 11/013,757

(22) Filed: Dec. 15, 2004

(65) Prior Publication Data
US 2005/0134039 A1 Jun. 23, 2005

(30) Foreign Application Priority Data
Dec. 19, 2003 (DE) ................. 103 59 799

(51) Int. Cl.
*F16L 33/00* (2006.01)
(52) U.S. Cl. .................. 285/252; 285/242; 285/253; 285/259
(58) Field of Classification Search ................ 285/242, 285/252, 253, 259
See application file for complete search history.

(56) References Cited

U.S. PATENT DOCUMENTS

| | | | | |
|---|---|---|---|---|
| 684,582 A * | 10/1901 | McGuire | ................ | 285/114 |
| 1,072,896 A * | 9/1913 | Albee | ................ | 285/114 |
| 1,204,650 A * | 11/1916 | Clafin | ................ | 285/114 |
| 2,358,575 A | 9/1944 | Hurley | | |
| 4,453,746 A * | 6/1984 | Keenan | ................ | 285/256 |
| 4,537,183 A * | 8/1985 | Fogarty | ................ | 600/40 |
| 5,195,788 A * | 3/1993 | Oetiker | ................ | 285/252 |
| 5,306,051 A * | 4/1994 | Loker et al. | ................ | 285/222.1 |
| 5,630,255 A * | 5/1997 | Eliasson | ................ | 24/274 R |
| 6,155,302 A * | 12/2000 | Fischerkeller et al. | ................ | 138/109 |
| 6,155,610 A * | 12/2000 | Godeau et al. | ................ | 285/242 |
| 6,170,885 B1 * | 1/2001 | Stuemky | ................ | 285/242 |
| 6,641,177 B1 * | 11/2003 | Pinciaro | ................ | 285/242 |
| 6,880,862 B2 * | 4/2005 | Mobley et al. | ................ | 285/238 |

FOREIGN PATENT DOCUMENTS

| | | |
|---|---|---|
| DE | 29 19 939 | 11/1980 |
| DE | 2919939 | 11/1980 |
| DE | 41 35 017 A1 * | 4/1993 |
| EP | 0 286 561 | 10/1988 |
| EP | 0166756 | 3/1989 |
| GB | 1 523 201 | 8/1978 |
| WO | 85/02894 | 7/1985 |

* cited by examiner

Primary Examiner—James M. Hewitt
(74) Attorney, Agent, or Firm—Friedrich Kueffner

(57) ABSTRACT

A hose coupling with a clamp which can be clamped around a longitudinal axis, wherein the edges of the clamp are located closer to the longitudinal axis than an area of the clamp located between the edges. The hose coupling further includes a pipe, wherein an end portion of the hose can be pushed onto an end portion of the pipe and can be clamped by means of the clamp. The end portion of the pipe is provided with a circumferential holding rib, wherein the end portion of the hose can be pushed past the holding rib and wherein the clamp can be clamped on the hose above the holding rib so that the hose is secured between the holding rib and the clamp. The clamp includes an elastic, circular circumferential metal clamping band of uniform thickness.

9 Claims, 1 Drawing Sheet

HOSE COUPLING

BACKGROUND OF THE INVENTION

1. Field of the Invention

The present invention relates to a hose coupling with a clamp which can be clamped around a longitudinal axis, wherein the edges of the clamp are located closer to the longitudinal axis than an area of the clamp located between the edges. The hose coupling further includes a pipe, wherein an end portion of the hose can be pushed onto an end portion of the pipe and can be clamped by means of the clamp. The end portion of the pipe is provided with a circumferential holding rib, wherein the end portion of the hose can be pushed past the holding rib and wherein the clamp can be clamped on the hose above the holding rib so that the hose is secured between the holding rib and the clamp.

2. Description of the Related Art

In a known hose coupling of this type disclosed in DE 29 19 939 A1, the clamp body has the shape of a C-ring of plastics material with clamping jaws integrally formed at the ends of the C-ring, wherein a clamping screw is inserted between the clamping jaws. The contour of the axial cross-section of the clamp body is preferably tripezoidally shaped in the interior of the clamp body, but is approximately rectangular on the outside. Alternatively, the clamp body may also have an axial cross-section which is, for example, circular segment-shaped or elliptical in the interior. The pipe may be, for example, a pipe piece which is also of plastics material. The contour of the axial cross-section of the holding rib is shaped so as to correspond to the inner contour of the clamp body, i.e., the contour is also preferably trapezoidally shaped or, for example, circular or elliptical. The plastics material is preferably reinforced with glass fibers. Consequently, its thermal expansion coefficient is low, but its elasticity is also low. Therefore, the clamp body is just sufficiently flexible in order to clamp the clamp. However, because of its high geometrical moment of inertia, this requires a correspondingly high clamping force. Consequently, the clamp body is not capable of elastically following the yielding or "flowing away" of the hose material due to the radial clamping pressure of the clamp, in order to ensure permanent tightness of the connection between the hose and the pipe. The tightness of the connection is essentially based on the fact that the elastic hose material is held under pretension in the space between the clamp and the holding rib. When the elasticity of the hose material decreases due to the clamping pressure and thermal aging, the connection can still become untight when the fluid pressure in the hose and pipe is high.

EP 0 166 756 B1 discloses arranging a resilient, uniformly thick metal band between a worm drive hose clamp and a hose to be clamped on a smooth or unribbed metal pipe, wherein the axial cross-sectional contour is uniformly outwardly arched in an axially middle portion and is provided at the edges of the middle portion with radially inwardly arched beads. During tensioning of the worm drive hose clamp, the metal band is pressed with its middle portion and the beads against the hose. This causes the hose material in the area between the beads to be pressed axially and radially, in order to achieve as high a sealing effect as possible by means of the elastic hose material in the middle portion of the metal band between the beads. Simultaneously, the metal band is supposed to facilitate an automatic after sealing when the elasticity of the hose material decreases, because the beads press against the hose with radial spring pretension and are supposed to elastically move in when the hose material yields. Aside from the fact that the worm drive hose clamp, which effects clamping of the metal band, is complicated, it impedes the free elastic mobility of the metal band. Moreover, because of their high geometrical moment of inertia, the beads contribute to the stiffening of the metal band.

SUMMARY OF THE INVENTION

It is the object of the present invention to provide a hose coupling of the above-described type which is of simple construction and ensures a high tightness of the connection between the hose and the pipe, independently of thermal aging and a permanent deformation or yielding of the hose material under the clamping pressure.

In accordance with the present invention, the clamp includes an elastic, circular circumferential metal clamping band of uniform thickness.

As a result of the configuration according to the present invention, the clamp has a lower geometrical moment of inertia than the known clamp. Consequently, the clamp according to the present invention has a high elastic flexibility about the transverse axes which extend perpendicularly of the longitudinal axis. The edges can easily follow a reduction of the hose thickness due to aging or pressure, and the edges can continue to clamp the hose firmly against the pipe, without having to retension the clamp in order to keep the connection tight. Also, the clamp can follow or yield to changes of the dimensions of the pipe and the hose and of its own dimensions within a great temperature range of about −40° C. to 200° C.

In accordance with a preferred feature, the area of the clamping band located between the edges of the clamping band has in the tensioned state of the clamp a distance from the hose. This distance additionally contributes to the fact that the radial pressing force of the clamping band edges is relatively high between the edges of the clamping band as compared to the middle area, and that a sufficiently high clamping effect is achieved in the areas of the edges, while the hose material is not pressed or is not pressed too strongly in the middle portion between the edges and, thus, is not subject to permanent pressure deformation. This distance can be easily maintained when the clamping jaws at the ends of the clamping band rest against each other when the distance is reached, or by using a clamping screw for pulling the clamping jaws together, for example, by means of a torque wrench, which cannot be tensioned further beyond a torque at which the distance is reached.

In accordance with an advantageous further development, the radially outer contour of the axial cross-section of the holding rib is uniformly arched, wherein the radially outer contour of the axial cross-section of the holding rib may be circular arc-shaped. This shape can be easily manufactured and prevents a high surface area pressure in the hose at edges of the holding rib.

The cross-sectional contour of the clamping band between the edges thereof may also be uniformly radially outwardly arched, preferably circular arc-shaped. This shape of the clamping band can also be easily manufactured and prevents excessive surface area pressures between the hose and the clamping band when the clamping band is tensioned too strongly.

It may also be ensured that the radius of curvature of the radially outer contour of the axial cross-section of the holding rib is greater than the radius of curvature of the inner contour of the axial cross-section of the clamping band. The pressure of the clamping band is then primarily exerted on the hose in the area of the holding rib, so that the hose cannot be further displaced until the holding rib and clamping band interact with each other, even in the case of high axial loads on the connection.

The pipe is preferably of metal, particularly light metal. This material not only contributes to the reduction of the total weight of a unit, for example, of a motor vehicle, in which the hose is connected to a pipe, for example, a pipe connection of the cooling unit, but this material is also more resistant to aging, particularly with respect to temperature variations, than is plastics material.

The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
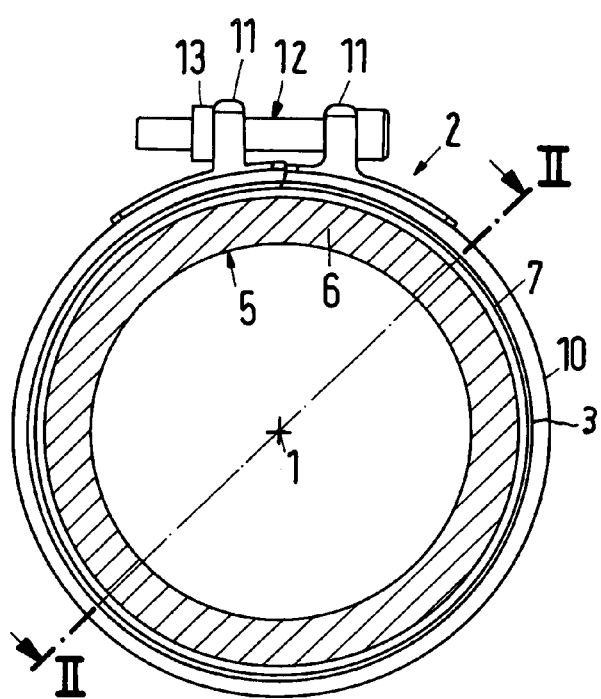
FIG. 1 is a cross-sectional view of the hose coupling according to the present invention taken along sectional line I-I of FIG. 2.
Figure 2:
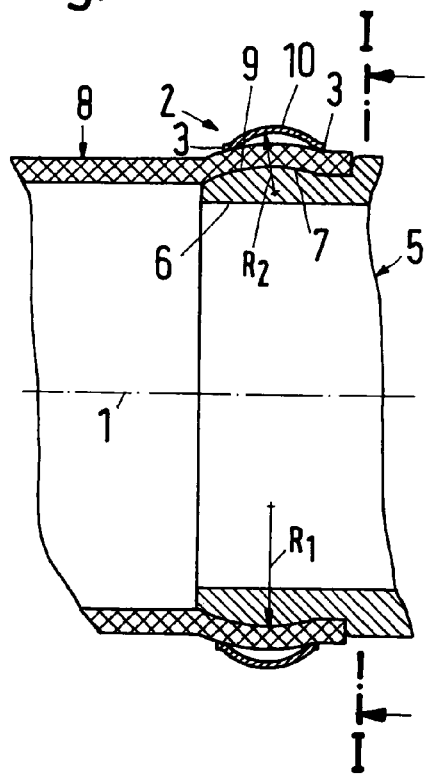
FIG. 2 is a sectional view taken along sectional line II-II of FIG. 1.
Figure 3:
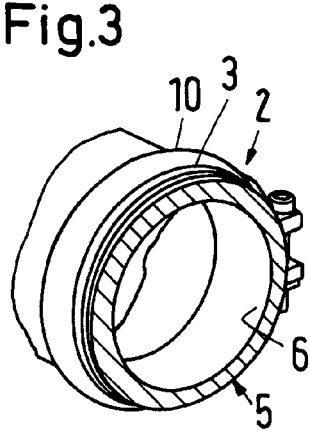
FIG. 3 is a perspective view of the cross-section I-I of FIG. 2.
Figure 4:
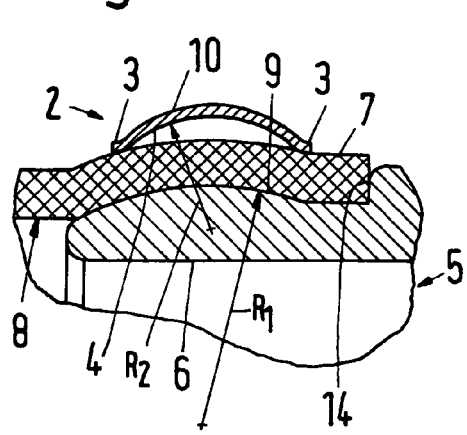
FIG. 4 is an illustration of a detail, on a larger scale, of the hose coupling of FIG. 2.

The hose coupling illustrated in the drawing includes a clamp 2 which can be clamped around a longitudinal axis 1. The edges 3 of the clamp 2 are located closer to the longitudinal axis 1 than is the area 4 located between the edges 3. The coupling further includes a pipe 5, wherein an end portion 7 of the hose 8 can be pushed onto an end portion 6 of the pipe 5 and can be clamped by means of the clamp 2. The end portion 6 of the pipe 5 is provided with a circumferential holding rib 9 over which the end portion 7 of the hose 8 can be pushed and at which the clamp 2 can be clamped onto the hose 8, so that the hose 8 is clamped between the holding rib 9 and the clamp 2. The clamp 2 has an elastic clamping band 10 of metal. The clamping band 10 has the shape of a C-ring, wherein clamping jaws 11 are attached to the ends of the C-ring, for example, by riveting or welding. A screw 12 is inserted through the clamping jaws, wherein the head of the screw 12 rests against one of the clamping jaws and is screwed through a nut 13 resting against the other clamping jaw 11.

The area of the clamping band 10 located between the edges 3 has a distance from the hose 8 in the tensioned state of the clamp 2. The edges or margins of the clamping band 10 are positioned adjacent to the sides or flanks of the holding rib 9.

The radially outer contour of the axial cross-section of the holding rib 9 is uniformly arched, preferably circular arc-shaped. The circumference of the holding rib 9, on the side of the free pipe end located in the hose 8 when the pipe 5 and hose 8 are connected, is smaller than the circumference at its other end.

The cross-sectional contour of the clamping band 10 between its edges 3 is also uniformly radially outwardly arched, preferably circular arc-shaped.

The radius of curvature $R_1$ of the radially outer contour of the axial cross-section of the holding rib 9 is greater than the radius of curvature $R_2$ of the inner contour of the axial cross-section of the clamping band 10.

The pipe 5 is of metal, particularly light metal, i.e., aluminum.

Constructing the clamp 2 with the elastic clamping band 10 of uniform thickness of metal, provides the advantage that the clamping band 10 has a smaller geometrical moment of inertia so that it has a high elastic flexibility about the transverse axes extending perpendicularly of its longitudinal axis 1. The edges 3 can easily conform to a reduction of the hose thickness due to aging or pressure and can continue to clamp the hose 8 tightly against the pipe 5, without the clamp 2 having to be retensioned in order to keep the connection tight.

Moreover, the clamp 2 can yield or conform to changes of the dimensions of the pipe 5 and the hose 8 and its own dimensions within a large temperature range of about −40° C. to 200° C. The stiffness of the clamp still remains sufficiently high for being able to tightly clamp the clamp 2 at the holding rib 9 safely on the pipe 5 against high axial pressure components of the fluid which is conducted through the hose 8 and the pipe 5. The distance of the area of the hose 8 located between the edges 3 of the clamping band 10 contributes additionally, in the tensioned state of the clamp 2, to the fact that the radial compressive force of the clamping band edges 3 is relatively high as compared to the compressive force of the middle portion 4 between the edges 3 of the clamping band 10 and that a sufficiently high clamping effect is achieved in the area of the edges 3, while the hose material in the middle area between the edges 3 is compressed not at all or not strongly and, therefore, is not subjected to a permanent pressure deformation. This distance can be easily maintained because of the fact that the clamping jaws 11 rest against each other when the distance is reached or by ensuring that the tensioning screw 12 cannot be further tensioned past a torque at which the distance is reached, for example, by means of a torque wrench.

The uniform, particularly circular, arc-shaped arched radially outer contour of the axial cross-section of the holding rib 9 prevents a high surface pressure in the end portion 7 of the hose 8, which is in contrast to edge-like configuration of the holding rib 9, and the radially outwardly arched contour can be easily manufactured.

Since the circumference of the holding rib 9 is at the free pipe end extending into the hose 8 when pipe 5 and hose 8 are connected smaller than the circumference at its other end, the hose 8 can be easily pushed on and over the holding rib 9. A step 14 of the pipe 5 or a wall of a unit, for example, a cooling unit of a motor vehicle, is tightly fastened or integrally formed with the end portion 6 and limits the distance by which the hose 8 can be pushed onto the pipe. Consequently, the pipe is short and only forms a connector for the hose.

The uniform, particularly circular arc-shaped outwardly arched cross-sectional contour of the clamping band 10 between the edges 3 can also be easily manufactured and prevents an excessive surface pressure between the hose 8 and the clamping band 10 when the clamping band 10 is tensioned too much.

Since the radius of curvature $R_1$ of the radially outer contour of the axial cross-section of the holding rib 9 is greater than the radius of curvature $R_2$ of the inner contour of the axial cross-section of the clamping band 10, the pressure of the clamping band 10 is primarily exerted onto the hose 8 in the area of the holding rib 9, so that, even if the connection is subjected to a high axial load, the hose 8 cannot be displaced until the holding rib 9 and the clamping band 10 interact.

The construction of the pipe 5 of metal, particularly light metal, not only contributes to the reduction of the total weight of a unit in which the hose 8 is connected to a pipe, for example, to a pipe connection of a cooling unit of a motor vehicle, but also ensures that the clamp is more resistant to aging, particularly resistant to temperature variations, than would be a pipe of plastics material.

The invention is not limited by the embodiments described above which are presented as examples only but can be modified in various ways within the scope of the protection defined by the appended patent claims.

We claim:

1. A hose coupling comprising;
   a clamp tensionable around a longitudinal axis,
   the clamp comprising an elastic, circularly bent, circumferentially extending metal clamping band of uniform thickness,
   the clamping band having two margins and an intermediate portion extending from one margin to the other of the margins, wherein the margins are located closer to the longitudinal axis than the entire intermediate portion; and
   a pipe having an end portion, wherein an end portion of a hose is configured to be pushable onto the end portion of the pipe and clampable by the clamp, wherein the end portion of the pipe has a circumferential holding rib over which the end portion of the hose can be pushed and at which the hose can be clamped between the holding rib and the clamp, the margins of the band being positioned adjacent both flanks of the holding rib wherein the intermediate portion of the clamping band located between the margins of the clamping band has a distance from the hose in a tensioned state of the clamp.

2. The hose coupling according to claim 1, wherein a radially outer contour of an axial cross-section of the holding rib is uniformly arched.

3. The hose coupling according to claim 2, wherein a radially outer contour of an axial cross-section of the holding rib is circular arc-shaped and a cross-sectional contour of the clamping band between the margins thereof is circular arc-shaped, and wherein a radius of curvature of the radially outer contour of the axial cross-section of the holding rib is greater than the radius of curvature of an inner contour of an axial cross-section of the clamping band.

4. The hose coupling according to claim 2, wherein the radially outer contour of the axial cross-section of the holding rib is circular arc-shaped.

5. The hose coupling according to claim 4, wherein, when the pipe and the hose are connected, a circumference of the holding rib at an end thereof located in the hose, is smaller than a circumference at another end of the holding rib.

6. The hose coupling according to claim 1, wherein a cross-sectional contour of the clamping band between the edges thereof is uniformly radially outwardly arched.

7. The hose coupling according to claim 6, wherein the cross-sectional contour of the clamping band is circular arc-shaped.

8. The hose coupling according to claim 1, wherein the pipe is of metal.

9. The hose coupling according to claim 8, wherein the pipe is of light metal.

* * * * *